US005097163A

United States Patent [19]

Shah et al.

[11] Patent Number: 5,097,163

[45] Date of Patent: Mar. 17, 1992

[54] ELECTRICAL POWER GENERATING SYSTEM HAVING REDUCED CONDUCTED EMISSIONS IN OUTPUT POWER

[75] Inventors: Mahesh J. Shah, Rockford; Derek N. Walton, Roscoe; Clarence F. Dolan, Rockford, all of Ill.

[73] Assignee: Sundstrand Corporation, Rockford, Ill.

[21] Appl. No.: 454,969

[22] Filed: Dec. 22, 1989

[51] Int. Cl.[5] ........................ H02K 5/24; H02K 19/38; H02K 7/20; H02K 11/00

[52] U.S. Cl. ........................ 310/51; 310/112; 322/58

[58] Field of Search ................ 310/51, 111, 112, 113, 310/190, 191; 322/10, 11, 29, 40, 58, 59

[56] References Cited

U.S. PATENT DOCUMENTS

| | | | |
|---|---|---|---|
| 3,227,941 | 1/1966 | Collamore | 322/25 |
| 3,714,483 | 1/1973 | Nurnberg et al. | 310/256 |
| 3,789,250 | 1/1974 | Macolt et al. | 310/154 |
| 4,110,676 | 8/1974 | Edick et al. | 310/112 |
| 4,258,281 | 3/1981 | Calfo et al. | 310/256 |
| 4,278,928 | 7/1981 | Griffiths et al. | 322/29 |
| 4,364,005 | 12/1982 | Kohzai et al. | 310/156 |
| 4,387,311 | 6/1983 | Kobayashi et al. | 310/43 |
| 4,442,396 | 4/1984 | Hucker | 322/21 |
| 4,559,487 | 12/1985 | Sims et al. | 322/24 |
| 4,581,555 | 4/1986 | Kuznetsov et al. | 310/178 |
| 4,621,212 | 11/1986 | Torossian et al. | 310/260 |
| 4,661,735 | 4/1987 | Miki et al. | 310/112 |
| 4,694,187 | 9/1987 | Baker | 310/112 |
| 4,733,155 | 3/1988 | Smith | 322/10 |
| 4,868,406 | 9/1989 | Glennon et al. | 322/29 |
| 4,924,674 | 5/1990 | Hara et al. | 322/31 |

*Primary Examiner*—Steven L. Stephan
*Assistant Examiner*—C. LaBalle
*Attorney, Agent, or Firm*—Antonelli, Terry, Stout & Kraus

[57] ABSTRACT

A brushless electrical power generating system (10) in accordance with the invention includes a main generator (16) having a rotor (30) on which is wound a field winding (32) and a stator (112) on which is wound a winding (36) for producing an alternating current electrical output having at least one phase; an exciter (14) having a rotor (24) mounted coaxial to the rotor of the main generator and a stator (110) on which is wound a stator winding (18) and an electrical field shield (40) disposed between the stators of the exciter and the main generator for shielding the winding of the stator of the main generator from an electric field produced by the winding of the stator of the exciter whereby capacitive coupling of any electrical noise present within the current flowing in the stator winding of the exciter to the alternating current electrical power output is reduced.

29 Claims, 2 Drawing Sheets

ϕA
ϕB
ϕC
N
3ϕ FULL WAVE RECTIFIER
VOLTAGE REGULATOR
PMG INCLUDING ROTOR AND STATOR WITH WINDINGS
10
12
14
16
18
20
22
24
26
28
32
34
36
38
40
41
43
45
114

CSD TRANSMISSION DRIVEN BY AIRFRAME PROPULSION ENGINE
108
104
14
106
110
18
40
24
36
16
32
112
30
100
120
114
116
118
104
12
102

ELECTRICAL POWER GENERATING SYSTEM HAVING REDUCED CONDUCTED EMISSIONS IN OUTPUT POWER

CROSS REFERENCE TO RELATED APPLICATION

Reference is made to patent application Ser. No. U.S. Ser. No. 454,968 (Attorney Docket Number 002.28185X00), entitled "Brushless Power Generating System Having Reduced Conducted Emissions in Output Power" filed on even date herewith, which is incorporated herein by reference in its entirety.

DESCRIPTION

1. Technical Field

The present invention relates to brushless electrical power generating systems.

2. Background Art

The Assignee of the present invention manufactures brushless electrical power generating systems which produce three phase alternating current at 400 Hz. for airframe applications. These power generating systems have a permanent magnet generator (PMG) having a permanent magnet rotor and a stator from which alternating current is produced which is rectified to produce electrical energy for a field winding mounted on the stator of an exciter without requiring an external power source. The current in the field winding of the exciter is pulse width modulated by a voltage regulator to control the voltage of the three phase 400 Hz. alternating current power output produced by a main generator. Three phase alternating current is produced by a rotor of the exciter which is rectified and applied to the field winding of the main generator which is mound on the rotor of the main generator. The rotors of the exciter and the main generator are mounted on a common shaft on which also is mounted the rectifier of the three phase alternating current produced by the exciter.

Manufacturers of airframes have specifications limiting the amount of electrical noise which may be present in the 400 Hz. three phase alternating current output from the main generator. Current designs of brushless electrical power generating systems for application in airframes can produce noise in the frequency range of 10 kHz. to 10 MHz. which exceeds the specifications of airframe manufacturers in the aforementioned frequency range.

Conventionally, LC filters have been utilized to filter the output power produced by the main generator to remove undesired frequency components including harmonics. The disadvantages of using LC filters to remove undesired frequency components are that the components are heavy in weight, sizable in volume and are expensive. Removal of undesired frequency components which have a power level which is very small with respect to the output power produced by the main generator at the fundamental frequency requires sizing of the filter components to handle the high power of the fundamental.

DISCLOSURE OF INVENTION

The present invention provides a brushless electrical power generating system having reduced noise in the output power produced by a main generator. While not limited thereto, the present invention is intended to reduce noise in the frequency range from approximately 10 kHz. to 10 MHz. without requiring filtering of the output power produced by the main generator. The invention is predicated upon the discovery by the inventors that a source of electrical noise in the output power produced by the main generator in the aforementioned frequency range is caused by capacitive coupling of noise present in current flowing in the stator windings of the exciter and the stator windings of a permanent magnet generator to the stator windings of the main generator which produce the alternating current electrical power output of the generating system. The present invention utilizes an electrical field shield disposed between the stator windings of the exciter and the stator windings of the main generator to reduce the aforementioned capacitive coupling to reduce the level of noise in the aforementioned frequency range present in the alternating current electrical power output produced by the main generator. Additionally, an electrical field shield may be disposed between the stator of the permanent magnet generator and the stator of the main generator to reduce capacitive coupling of any electrical noise present in current flowing in the stator windings of the permanent magnet generator to the stator windings of the main generator. Each electrical field shield is annular and coaxial to the stators between which the shield is mounted. The electrical field shield may be any conductive material which couples the electrical field produced by the undesired noise components flowing in the windings of the stators of the exciter and the permanent magnet generator to a reference potential such as a casing of an integrated drive generator in which the brushless electrical power generating system is contained.

A brushless electrical power generating system in accordance with the invention includes a main generator having a rotor on which is wound a field winding and a stator on which is wound a winding for producing an alternating current electrical power output having at least one phase; an exciter having a rotor mounted coaxial to the rotor of the main generator and a stator mounted coaxial to the stator of the main generator on which is wound a stator winding; and an electrical field shield disposed between the stators of the exciter and main generator for shielding the winding of the stator of the main generator from an electrical field produced by the winding of the stator of the exciter for reducing capacitive coupling of any electrical noise present within the current flowing in the stator winding of the exciter to the alternating current electrical power output. The electrical noise is between 10 KHz and 10 MHz. A voltage regulator is coupled to a point of regulation of the alternating current electrical power output and to the stator winding of the exciter for varying current flowing in the stator winding of the exciter as a function of an error signal proportional to a difference between a reference voltage which is proportional to a desired output voltage of the alternating current electrical power output and an actual voltage at the point of reference. The current flowing in the stator winding of the exciter is pulse width modulated by the voltage regulator as a function of the error signal. The rotors of the exciter and main generator are mounted on a common shaft driven by a constant speed drive transmission powered by an airframe propulsion engine. Further in accordance with the invention, a permanent magnet generator is provided having a rotor mounted coaxial to the rotors of the main generator and the exciter and a stator mounted coaxial to the stators of the main generator and the exciter; and an electrical field shield disposed between stators of the permanent magnet generator and the main generator for shielding the winding of the stator of the main generator from an electrical field produced by a winding of the stator of the permanent magnet generator for reducing capacitive coupling of any electrical noise present within the current flowing within the stator winding of the permanent magnet generator to the alternating current electrical power output. The electrical field shield disposed between the stators of the permanent magnet generator and the main generator is annular and coaxial to the stators of the permanent magnet generator, main generator and exciter.

In a brushless electrical power generating system for producing an alternating current output from a main generator having axially aligned exciter and main generator stators, an improvement in accordance with the invention includes an electric field shield disposed between the stators of the exciter and the main generator for shielding a winding of the stator of the main generator from an electrical field produced by a winding of the stator exciter for reducing capacitive coupling of any electrical noise present within current flowing within the stator winding of the exciter to the alternating current output. The electric field shield is annular and rotors of the exciter and main generator are mounted on a common shaft which is driven by a constant speed drive transmission driven by an airframe propulsion engine. The electrical noise is between 10 KHz and 10 MHz.

In a brushless electric power generating system for producing an alternating current output from a main generator having axially aligned permanent magnet generator, exciter and main generator stators, an improvement in accordance with the present invention includes an electrical field shield disposed between the stators of the exciter and the main generator for shielding a winding of the stator of the main generator from an electrical field produced by a winding of the stator exciter for reducing capacitive coupling of any electrical noise present within current flowing in the stator winding of the exciter to the alternating current output and an electrical field shield disposed between stators of the permanent magnet generator and the main generator for shielding the winding of the stator of the main generator from an electric field produced by a winding of the stator of the permanent magnet generator for reducing capacitive coupling of any electrical noise present within the current flowing in the stator winding of the permanent magnet generator to the alternating current electrical power output. The shields are annular and the rotors of the permanent magnet generator, the exciter and the main generator are mounted on a common shaft which is driven by a constant speed drive transmission driven by an airframe propulsion engine.

BEST MODE FOR CARRYING OUT THE INVENTION

Figure 1:
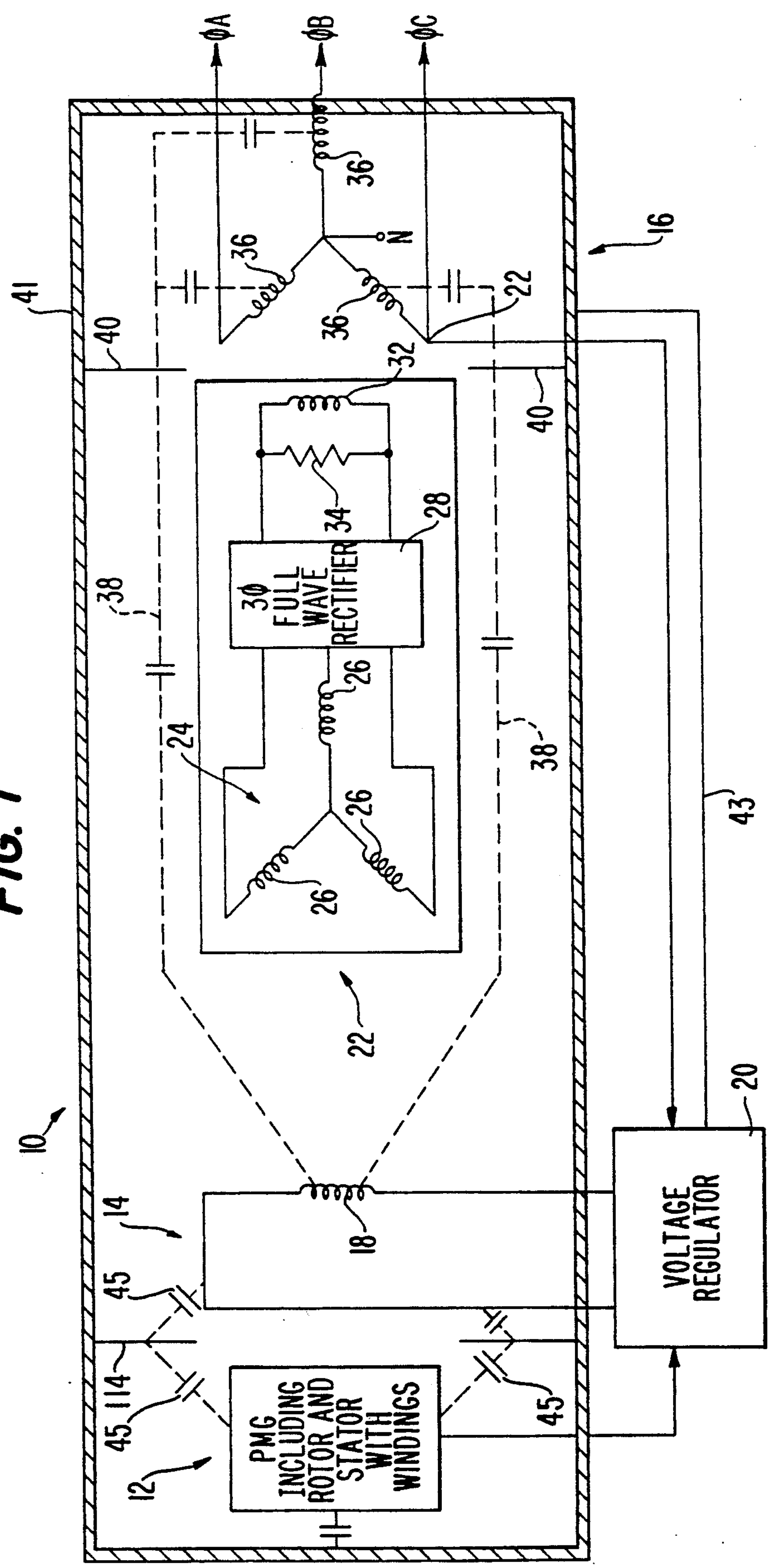
FIG. 1 illustrates an electrical schematic of the present invention.
Figure 2:
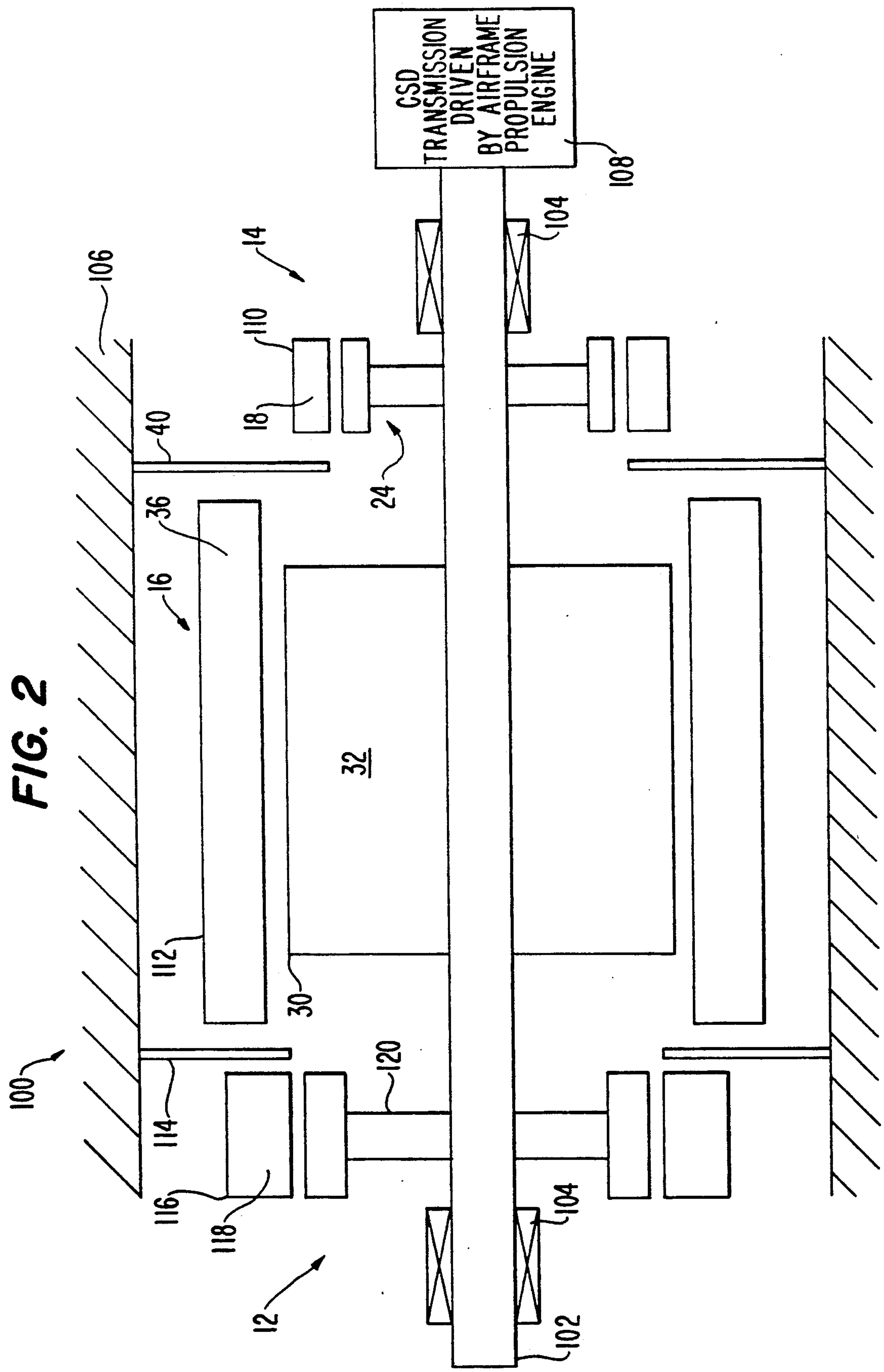
FIG. 2 illustrates an embodiment of the present invention for application in an airframe.

FIG. 1 illustrates an electrical schematic of a brushless electrical power generating system 10 in accordance with the present invention. The brushless electrical power generating system 10 is comprised of a permanent magnet generator 12, an exciter 14 and a main generator 16 as is conventional with brushless airframe electrical power generating systems of the type manufactured by the assignee of the present invention. The permanent magnet generator 12 has a permanent magnet rotor and a stator for producing alternating current. The alternating current produced by the stator of the permanent magnet generator is rectified by a rectifier (not illustrated) to supply self-excitation to the field winding 18 of the exciter 14 which is mounted on the stator of the exciter. Voltage regulator 20 is coupled to a point of regulation 22 in the alternating current output power produced by the main generator 16 and to the rectified current produced from the stator of the permanent magnet generator 12. The voltage regulator 20 varies current flowing in the stator winding 18 of the exciter as a function of an error signal proportional to a difference between a reference voltage which is proportional to a desired output voltage of the alternating current electrical power output and an actual voltage of the point of reference. The current flowing in the stator winding 18 of the exciter 14 is pulse width modulated by the voltage regulator 20 as a function of the error signal. An assembly 22, which is mounted on a single shaft (FIG. 2), contains the rotor 24 of the exciter on which is wound a three phase winding 26, a three phase full wave rectifier 28, a rotor 30 of the main generator on which is wound a field winding 32 and a Burdon resistor which is connected in parallel with the field winding 32 for purposes of attenuating differential noise present in the output of the three phase rectifier. The rotor of the permanent magnet generator 12 may be mounted on the assembly 22 which is driven by a constant speed drive transmission powered by an airframe propulsion engine as illustrated in FIG. 2 or alternatively on a second shaft driven by the constant speed drive transmission in unison with the shaft on which the rotors 24 and 30 respectively of the exciter and main generator are mounted.

The present invention is predicated upon the discovery that electrical noise present in the output three phases 36 from the main generator 16 is produced in part by a noise current flowing in the field winding 18 of the exciter 14. The noise current is produced by the pulse width modulation of the current flowing in the field winding 18 of the exciter 14 to accomplish voltage regulation and additionally may be caused by the rectification of the alternating current produced by the stator of the permanent magnet generator 12 which rectified current drives the field winding of the exciter. Reference numeral 38 identifies the individual capacitive coupling between the field winding 18 of the exciter 14 and each of the phase windings 36 of the main generator 16. The present invention reduces the capacitive coupling 38 between the field winding 18 and the phase windings 36 by an electric field shield 40 of a conductive material which shields the windings of the main generator 16 from the electrical field produced by the noise current flowing within the field winding of the exciter. The electric field shield 40 is attached to the casing 41 which may be part of a conventional integrated drive generator of a conventional airframe electrical power generating system. Noise current is shunted by the case 41 by coupling 43 back to the voltage regulator 20. The electrical field shield 40 is disposed between the stators of the exciter 14 and the main generator 16, is annular and is coaxial to the stators of the exciter and the main generator as illustrated in FIG. 2. The conductive material from which the electrical field shield 40 is manufactured shunts the electrical field produced by noise current flowing within the field winding 18 of the exciter 14 from being coupled to the phase windings 36 of the main generator 16 to reduce the capacitive coupling therebetween. As a result, the level of noise present in the output phases $\phi A-\phi C$ of the main generator 16 in the frequency range of 10 kHz. to 10 MHz. is reduced.

The present invention is further predicated upon the discovery that electrical noise present in the output three phase windings 36 may be produced by a noise current flowing in the stator windings of the permanent magnet generator 12. Reference numeral 45 identifies the capacitive coupling of the noise current between the stator windings of the permanent magnet generator 12, the exciter 14 and main generator 16. The present invention reduces the capacitive coupling 45 between the permanent magnet generator 12, exciter 14 and main generator 16 by an electrical field shield 114 of a conductive material. The shields 40 and 114 are of similar construction. The conductive material from which the electrical field shield 114 is manufactured shunts any electrical field produced by noise current flowing in the stator of the permanent magnet generator 12 from being coupled to the exciter 14 and main generator 16 to reduce the capacitive coupling therebetween.

The usage of the electrically conductive annular electric field shields 40 and 114 has several advantages. In the first place, filters are not utilized for reducing the noise current. As described above, filtering of the high power output from the phases $\phi A-\phi C$ represents a weight, size and cost penalty. The annular electric field shields 40 and 114 are light in weight, do not add appreciable volume to the electric power generating system 10, and are not expensive to manufacture.

FIG. 2 illustrates an embodiment 100 of an electrical power generating system in accordance with the present invention. Like reference numerals identify like parts in FIGS. 1 and 2. The configuration of FIG. 2 differs from that of FIG. 1 in that the permanent magnet generator 12 in FIG. 1 is outboard of the exciter 14 with respect to the main generator wherein in FIG. 2 the permanent magnet generator is on an opposite side of the main generator. The invention may be practiced with either configuration. The embodiment 100 has a single shaft 102 rotatably supported by bearings 104 which are symbolic of actual bearings utilized for rotatably supporting the permanent magnet generator 12, exciter 14 and main generator 16 of an integrated drive generator of the type manufactured by the Assignee of the present invention which is contained in an integral case 106. A power takeoff from an airframe propulsion engine drives a constant speed drive transmission 108 which drives the shaft 102 at a constant rotational velocity independent of variation of the rotational velocity of the power take off from the propulsion engine to produce 400 Hz. three phase electrical power.

The electric field shield 40 is coaxial to the shaft 102 and is disposed between the stator 110 of the exciter 14 and the stator 112 of the main generator 16 to prevent the aforementioned capacitive coupling. The electrically conductive annular electric field shield 40 is connected to the case 106 of the integrated drive generator. The annular electric field shield 40 is coaxial with the stators 110 and 112, respectively, of the exciter 14 an the main generator 16.

The electrically conductive annular electric field shield 114 as illustrated in FIG. 2 is disposed between the stator 112 of the main generator 16 and the stator 116 of the permanent magnet generator 12. The electric field shield 114 is coaxial to the shaft 102 and the stators 112 and 116. The rotor 120 of the permanent magnet generator 12 is of conventional construction.

While the present invention has been described in terms of its preferred embodiment, it should be understood that numerous modifications may be made thereto without departing from the spirit and scope of the present invention as defined in the appended claims. It is intended that all such modifications fall within the scope of the appended claims.

We claim:

1. A brushless electrical power generating system comprising:
   a main generator having a rotor on which is wound a field winding and a stator on which is wound a winding for producing an alternating current electrical power output having at least one phase;
   an exciter having a rotor mounted coaxial to the rotor of the main generator and a stator mounted coaxial to the stator of the main generator on which is wound a stator winding; and
   an electric field shield disposed between the stators of the exciter and main generator for shielding the winding of the stator of the main generator from an electrical field produced by the winding of the stator of the exciter for reducing capacitive coupling of any electrical noise present within current flowing in the stator winding of the exciter to the alternating current electrical power output.

2. A brushless electrical power generating system in accordance with claim 1 further comprising;
   a voltage regulator coupled to a point of regulation of the alternating current electrical power output and to the stator winding of the exciter for varying current flowing in the stator winding of the exciter as a function of an error signal proportional to a difference between a reference voltage which is proportional to a desired output voltage of the alternating current electrical power output and an actual voltage of the point of reference.

3. A brushless electrical power generating system in accordance with claim 2 wherein:
   the current flowing in the stator winding of the exciter is pulse width modulated by the voltage regulator as a function of the error signal.

4. A brushless electrical power generating system in accordance with claim 1 wherein:
   the rotors of the exciter and main generator are mounted on a common shaft driven by a constant speed drive transmission powered by an airframe propulsion engine.

5. A brushless electrical power generating system in accordance with claim 2 wherein:
   the rotors of the exciter and main generator are mounted on a common shaft driven by a constant speed drive transmission powered by an airframe propulsion engine.

6. A brushless electrical power generating system in accordance with claim 3 wherein:
   the rotors of the exciter and main generator are mounted on a common shaft driven by a constant speed drive transmission powered by an airframe propulsion engine.

7. A brushless electrical power generating system in accordance with claim 1 further comprising:

a permanent magnet generator having a rotor mounted coaxial to the rotors of the main generator and the exciter and a stator mounted coaxial to the stators of the main generator and the exciter; and an electric field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

8. A brushless electrical power generating system in accordance with claim 2 further comprising:

a permanent magnet generator having a rotor mounted coaxial to the rotors of the main generator and the exciter and a stator mounted coaxial to the stators of the main generator and the exciter; and an electrical field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

9. A brushless electrical power generating system in accordance with claim 3 further comprising:

a permanent magnet generator having a rotor mounted coaxial to the rotors of the main generator and the exciter and a stator mounted coaxial to the stators of the main generator and the exciter; and an electric field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

10. A brushless electrical power generating system in accordance with claim 4 further comprising:

a permanent magnet generator having a rotor mounted coaxial to the rotors of the main generator and the exciter and a stator mounted coaxial to the stators of the main generator and the exciter; and an electric field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

11. A brushless electrical power generating system in accordance with claim 5 further comprising:

a permanent magnet generator having a rotor mounted coaxial to the rotors of the main generator and the exciter and a stator mounted coaxial to the stators of the main generator and the exciter; and an electric field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

12. A brushless electrical power generating system in accordance with claim 6 further comprising:

a permanent magnet generator having a rotor mounted coaxial to the rotors of the main generator and the exciter and a stator mounted coaxial to the stators of the main generator and the exciter; and an electric field shield disposed between the stators of the permanent magnet generator and the main generator for shielding the winding of the stator of the main generator from an electrical field produced by a winding of the stator of the permanent magnet generator for reducing capacitive coupling of any electrical noise present within the current flowing in the stator winding of the permanent magnetic generator to the alternating current electrical power output.

13. A brushless electric power generating system in accordance with claim 1 wherein:

the electric field shield is annular and coaxial to the stators of the exciter and main generator.

14. A brushless electrical power generating system in accordance with claim 4 wherein:

the electric field shield is annular and coaxial to the stators of the exciter and main generator.

15. A brushless electrical power generating system in accordance with claim 7 wherein:

the electric field shields are annular and coaxial to the stators of the permanent magnet generator, main generator and exciter.

16. A brushless electrical power generating system in accordance with claim 10 wherein:

the electric field shields are annular and coaxial to the stators of the permanent magnet generator, main generator and exciter.

17. In a brushless electric power generating system for producing an alternating current output from a main generator having axially aligned exciter and main generator stators, the improvement comprising:

an electric field shield disposed between the stators of the exciter and the main generator for shielding a winding of the stator of the main generator from an electrical field produced by a winding of the stator exciter for reducing capacitive coupling of any electrical noise present within current flowing in the stator winding of the exciter to the alternating current output.

18. A brushless electric power generating system in accordance with claim 17 wherein:

the electric field shield is annular and rotors of the exciter and main generator are mounted on a common shaft which is driven by a constant speed drive transmission driven by an airframe propulsion engine.

19. In a brushless electric power generating system for producing an alternating current output from a main generator having axially aligned permanent magnet, exciter and main generator stators, the improvement comprising:

an electric field shield disposed between the stators of the exciter and the main generator for shielding a winding of the stator of the main generator from an electrical field produced by a winding of the stator exciter for reducing capacitive coupling of any electrical noise present within current flowing in the stator winding of the exciter to the alternating current output; and an electric field shield disposed between stators of the permanent magnet generator and the main generator for shielding the winding of the stator of the main generator from an electric field produced by a winding of the stator of the permanent magnet generator for reducing capacitive coupling of any electrical noise present within the current flowing in the stator winding of the permanent magnet generator to the alternating current electrical power output.

20. A brushless electric power generating system in accordance with claim 19 wherein:

the shields are annular and the rotors of permanent magnet generator, the exciter and the main generator are mounted on a common shaft which is driven by a constant speed drive transmission driven by an airframe propulsion engine.

21. A brushless electrical power generating system in accordance with claim 1 wherein:

the electrical noise is within a frequency range between 10 KHz and 10 MHz.

22. A brushless electrical power generating system in accordance with claim 7 wherein:

the electrical noise is within a frequency range between 10 KHz and 10 MHz.

23. A brushless electrical power generating system in accordance with claim 8 wherein:

the electrical noise is within a frequency range between 10 KHz and 10 MHz.

24. A brushless electrical power generating system in accordance with claim 9 wherein:

the electrical noise is within a frequency range between 10 KHz and 10 MHz.

25. A brushless electrical power generating system in accordance with claim 10 wherein:

the electrical noise is within a frequency range between 10 KHz and 10 MHz.

26. A brushless electrical power generating system in accordance with claim 11 wherein:

the electrical noise is within a frequency range between 10 KHz and 10 MHz.

27. A brushless electrical power generating system in accordance with claim 12 wherein:

the electrical noise is within a frequency range between 10 KHz and 10 MHz.

28. A brushless electrical power generating system in accordance with claim 17 wherein:

the electrical noise is within a frequency range between 10 KHz and 10 MHz.

29. A brushless electrical power generating system in accordance with claim 19 wherein:

the electrical noise is within a frequency range between 10 KHz and 10 MHz.

* * * * *